United States Patent Office
3,339,435
Patented Sept. 5, 1967

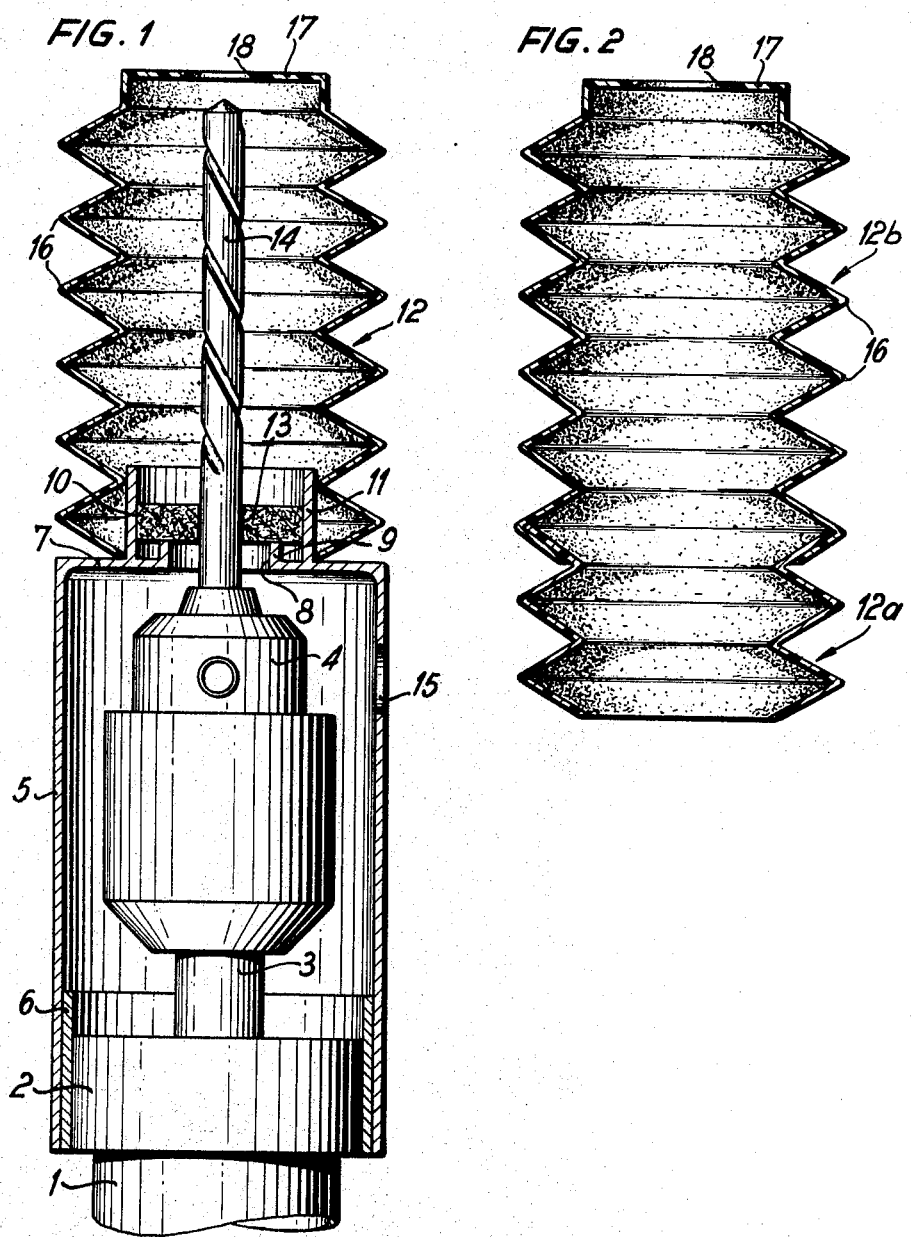

3,339,435
DEVICE FOR DRILLING MACHINES FOR COLLECTING CHIPPED MATERIAL
Walter-Helmut Heitz, 32 Kurt-Schumacher-Strasse, Hannover, Germany
Filed Oct. 12, 1965, Ser. No. 495,222
Claims priority, application Germany, Oct. 13, 1964, H 54,023
5 Claims. (Cl. 77—55)

This invention relates to a device for drilling machines for collecting chipped material, especially drillings, during the drilling of holes in ceilings and walls, which device consists of an axially compressible bellows type receptacle of elastic material which is detachably mounted on the housing of a drilling machine and which, when not being compressed, projects with its front edge beyond the drill bit of the drilling machine.

Devices for collecting chipped material are required above all when drilling with a drilling machine held over the operator's head, e.g. when drilling holes in ceilings and ceiling beams, since without such a device the chipped material would drop onto the person operating the drilling machine. This would cause fouling of the operator's clothes and of the environs of the drilling site and involve the risk of drillings or fine chips getting in the operator's eyes and causing inflammation of the eyes unless the operator should wear protective glasses. Also the drilling of holes in vertical walls without the use of a device collecting the chipped material always leads to an undesirable fouling of the environs, especially also to the formation of spots on the wallpaper if a dowel hole or an opening is to be drilled in a wall of a room.

Furthermore, drilling machines when used without a collecting device are subjected to increased wear during operation due to drillings or fine chips getting between clamping jaws and the sliding surfaces guiding them. In this place the foreign bodies hinder the rotary movement of the parts sliding upon each other and cause damage to the sliding surfaces by abrasive action whereby the drilling machine becomes prematurely unserviceable.

To avoid these shortcomings and inconveniences, it has already been suggested to detachably mount on the housing of the drilling machine a device for collecting the drillings which consist of an inner cap member covering the chuck and of an outer jacket constructed as a compressible bellows or formed by disc-like members covering one another. The outer jacket is formed integral with the inner cap or rigidly connected therewith. Securing of the known double-walled dust collector cap to the housing of the drilling machine is effected in such a manner that the cap is clamped with an inwardly projecting annular bead in a circumferentially extending groove in the front marginal section of the housing of the drilling machine or screwed on an external thread of the housing of the drilling machine or fixed by means of an angular slot in the manner of a bayonet joint to a lateral bolt on the housing of the drilling machine.

These modes of securement call for a particular adaptation of the housing of the drilling machine and necessitate the manufacture of dust collector caps suitable for each individual type of the drilling machines which are made in very different designs and with different outside diameters. The costs of the molds for the manufacture of such dust collector caps and the necessity of making changes to the housing of the drilling machine are considerable impediments to the practical applicability of the known dust collecting devices.

A further disadvantage of the hitherto known dust collector caps consists in that they hinder the application of the drill bit to the proper place because the person holding the drilling machine is not in a position to push with one hand only the hollow cylindrical end section or the ends of the disc-like members of the outer jacket from the point of application back to such an extent that this point and the drill bit are freely exposed. The suggestion to manufacture the outer jacket of the double-walled dust collector cap from transparent material does not yield a satisfactory solution. For, apart from the fact that up to the present no synthetic plastics material is available that is so transparent as would be required for clearly recognizing the drill bit and the point of application of the drill, the transparency of the outer jacket would no longer be existent after the very first use of the dust collector cap because it would be frustrated by the drilling dust adhering to the inner surface of the outer jacket.

The known double-walled dust collector caps fail to fulfill their purpose if holes are to be drilled in vertical walls. For, when the drilling machine is withdrawn from the wall together with the dust collector cap after a hole has been drilled, it is inevitable that part of the amount of drillings which has accumulated along the downwardly facing marginal edge of the outer jacket drops out of the dust collector cap.

It is the object of the present invention to avoid the aforedescribed shortcomings of the known double-walled dust collector caps and to provide a device for collecting chipped material, the applicability of which is independent of the design and the outside diameter of the housing of the drilling machine, which can also be brought subsequently and used for any already existing drilling machine, which is easily connectible to the housing of the drilling machine, which permits the drill bit to be exposed at the beginning of the drilling operation and which reliably retains the collected drillings in the chip collector space when drilling holes in vertical walls. By the invention it is further intended to protect the surfaces of the jaws of the chuck and of the housing of the drilling machine sliding upon each other completely against the penetration of drillings and chips.

These objects are achieved according to the invention in that the collecting device is constructed as a bellows type receptacle having a lateral wall and closed at its front end by an end wall having a central opening and this bellows type receptacle is slipped on a sleeve mounted with force fit on the housing of a drilling machine and carrying a perforated sealing member at the point where the drill of the drilling machine passes through the sleeve. The bellows type receptacle which is formed with a plurality of preferably sharp-edge folds can be easily compressed in axial direction and can therefore be used for large depths of the holes to be drilled. The perforated end wall imparts to the front marginal section of the bellows type receptacle a great consistency which enables the front section of the bellows type receptacle to be pushed with one hand back from the surface in which the hole is to be drilled so as to freely expose the drill bit and the point of application on the surface to be drilled for the purpose of properly applying the drill bit to such surface. The perforated end wall reliably prevents the drillings accumulated in the bellows type receptacle from dropping out when the drilling machine is withdrawn from a vertical wall after a hole has been drilled therein.

The use of a slip-on sleeve as a means for detachably mounting the bellows type receptacle on the housing of the drilling machine provides an extremely simple mode of connecting the receptacle to the housing which permits to use the same bellows type receptacle for housings of drilling machines having different outside diameters. For this purpose it is further suggested according to the invention to mount the slip-on sleeve, if its inside diameter does not exactly correspond to the outside diameter of the housing of the respective drilling machine, on the front marginal edge section of the housing of the drilling machine by means of an insertable ring matching the outside diameter of the housing of the respective drilling machine The problem of sealing the chuck from the chipped material accumulating in the bellows type receptacle is solved by means of a perforated sealing member in a simpler and more perfect manner than in the known cover cap in which an annular disc is clamped on the drill, which disc must be positioned at a free distance from the upper edge of the inner cap member since it revolves with the drill. Through the annular gap formed thereby drillings can get to the chuck.

Advantageously, a set of annular sealing members having holes matching different diameters of the drills may be associated with the slip-on sleeve. This makes with extremely simple and inexpensive means allowances for the fact that drills with different diameters must be used on a drilling machine.

The requirement of having to work with drills which are of largely varying lengths and which have a length of 600 mm. and more when drilling openings in walls, can be largely met with the construction of the device for collecting the chipped material as a bellows type receptacle having one wall in that the length of the bellows type receptacle is variable according to the length of the respective drill by fitting the folds of two or more bellows type receptacle sections into one another.

To be able to fix the drill in the chuck and remove it therefrom without it being necessary each time to remove the connecting sleeve covering the chuck, it is recommendable to provide the sleeve with a lateral opening for the passage therethrough of a key for the operation of the chuck. A part from the labor saving achievable thereby, this involves the advantage of an improved accident prevention since the person using the drilling machine can by no means come into contact with the revolving chuck.

One embodiment of the invention will now be described by way of example and with reference to the accompanying drawing, in which:

FIG. 1 is a side view of the front section of a drilling machine with an attached device for collecting chipped material according to the invention shown in longitudinal central section, and FIG. 2 is a longitudinal section through a bellows type receptacle assembled from two sections.

As shown in FIG. 1, a housing 1 of a drilling machine which is of conventional construction terminates in a cylindrical section 2. To the end of a shaft 3 of the drilling machine projecting from the section 2 of the housing 1 a chuck 4 is fixed in a known manner.

Clamped on the section 2 of the housing 1 is a cylindrical sleeve 5 consisting of synthetic plastics material, sheet metal or the like. In case the inside diameter of the sleeve 5 does not exactly correspond to the outside diameter of the section 2 of the housing 1 but is larger than the last-mentioned diameter, an insertable ring 6 is employed for slipping the sleeve 5 on the section 2 of the housing 1, as shown in the particular example of FIG. 1, the outside diameter of the insertable ring corresponding to the inside diameter of the sleeve 5 and the inside diameter of the ring corresponding to the outside diameter of the section 2 of the housing 1. To be able to use mass-produced slip-on sleeves 5 of standard size for drilling machines in which the sections 2 of the housings 1 have different outside diameters and are of different lengths, it is thus only necessary to insert an appropriately dimensioned ring 6.

The slip-on sleeve 5 is provided at its front end with an end wall 7 which has a circular central opening 8. On the edge of the end wall 7 defining the central opening 8 there is formed a forwardly projecting tubular rim 9 which serves for reinforcing the end wall 7 and for supporting an annular sealing member 10. The tubular rim 9 is surrounded by a concentric tubular extension 11 situated at a free distance from the rim 9 and projecting from the end wall 7 to a larger extent. In the front section of the tubular extension 11 the annular sealing member 10 consisting of felt or the like is inserted. Slipped on the outer surface of the extension 11 is a bellows type receptacle 12 for collecting chips and drillings produced during the drilling operation.

The annular sealing member 10 engages with a wall 13 defining the hole in the sealing member tightly round a drill 14 held in the jaws of the chuck 4. However, being non-rotatably clamped in the front section of the tubular extension 11, the sealing member 10 does not participate in the rotary movement of the drill 14. The sealing member 10 seals the interior of the bellows type receptacle 12, in which the chips and drillings are received and collected, from the chuck 4 so perfectly that no drillings or fine chips can reach the sliding surfaces between the jaws of the chuck 4 and the housing 1 of the drilling machine.

If the drill 14 is exchanged for a drill of larger or smaller diameter, then also the annular sealing member 10 must be replaced by another annular sealing member the hole of which has a diameter corresponding in size to the diameter of the drill. It is therefore necessary to associate with the collecting device a number of sealing members 10 having holes of different diameters corresponding to the different sizes of the drills.

In the wall of the slip-on sleeve 5 at a point near the end wall 7 a lateral opening 15 is formed which permits a key for operating the chuck 4 to be fitted on a tightening screw of the chuck without it being necessary to remove the sleeve 5 from the section 2 of the housing 1 of the drilling machine.

The bellows type receptacle 12 which consists of rubber or elastic synthetic plastics material is formed with a plurality of folds 16 which, for the purpose of obtaining a large compressibility of the receptacle, are shaped so as to have the sharpest possible edges. At its front end the bellows type receptacle 12 is provided with an end wall 17 having a central opening 18 which is so dimensioned that it permits the unhindered passage therethrough of a drill with the largest diameter usable on the drilling machine. The edge of the end wall 17 defining the central opening 18 is beveled inwardly. This bevel ensures that the chipped material fed by the drill 14 into the bellows type receptacle 12 during the drilling operation cannot drop out of the receptacle when after the drilling of a hole in a vertical wall the drilling machine is removed from the wall together with the receptacle 12 which then returns from its more or less compressed state to its relaxed normal condition.

If holes of great depth are to be drilled, as e.g. the case in the making of openings in a wall, then two or more bellows type receptacle sections may be assembled to form an appropriately long bellows type receptacle if the normally used receptacle 12 should not be sufficient for this purpose. FIG. 2 shows an embodiment in which two bellows type receptacle sections 12a and 12b are combined into a long bellows type receptacle in that the first fold of one section 12a is fitted into the last fold of the other section 12b. Thus it is possible in a simple manner to give the bellows type receptacle 12 the length required for each individual case. Fitting the folds 16 into one another ensures a perfectly tight and sufficiently rigid connection of the bellows type receptacle sections 12a and 12b.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein. For example, for sealing the chuck 4 from the interior of the bellows type receptacle 12, instead of the annular sealing member 10 also a cap type body of synthetic plastics material may be used, the central section of which is constructed so as to project in the form of a truncated cone and has a central bore tightly encircling the shank of the drill. The body of synthetic plastics material is clamped in or on the tubular extension 11 of the sleeve 5. In this case the tubular rim 9 on the sleeve 5 may be dispensed with. It is, of course, likewise necessary to make a plurality of cap type sealing bodies with differently large openings available if the collecting device is to be used in connection with different drills.

I claim:

1. A device for drilling machines for collecting chipped material, especially drillings, during the drilling of holes in ceilings and walls, comprising an axially compressible bellows type receptacle of elastic material having a lateral wall and an end wall closing the receptacle at its front end and provided with a central opening, a sleeve mounted with force fit on the housing of a drilling machine and having said bellows type receptacle slipped thereon so that same is removable from the housing of the drilling machine, and a perforated sealing member carried by said sleeve at a point where the drill of the drilling machine passes through the sleeve, said bellows type receptacle when not being compressed projecting with its front edge beyond the drill bit.

2. A device as claimed in claim 1, wherein an insertable ring matching the outside diameter of the housing of the respective drilling machine is provided, through the intermediary of which the slip-on sleeve is mounted on a section of the housing of the drilling machine.

3. A device as claimed in claim 1, wherein a set of sealing members with central holes matching different diameters of the drills is associated with the slip-on sleeve.

4. A device as claimed in claim 1, wherein at least two bellows type receptacle sections are fitted with their folds into one another thereby to vary the length of the bellows type receptacle in accordance with the length of the respective drill.

5. A device as claimed in claim 1, wherein the slip-on sleeve has a lateral opening for the passage therethrough of a key for the operation of the chuck of the drilling machine.

References Cited

UNITED STATES PATENTS 2,792,199   5/1957   Becker et al. _____ 175—211

DONALD R. SCHRAN, *Primary Examiner.*